(12) United States Patent
Ellerhorst

(10) Patent No.: US 11,279,565 B2
(45) Date of Patent: Mar. 22, 2022

(54) ROLLER ASSEMBLY

(71) Applicant: Crown Plastics Co., Harrison, OH (US)

(72) Inventor: Peter Ellerhorst, Harrison, OH (US)

(73) Assignee: Crown Plastics Co., Harrison, OH (US)

( * ) Notice: Subject to any disclaimer, the term of this patent is extended or adjusted under 35 U.S.C. 154(b) by 0 days.

(21) Appl. No.: 17/117,831

(22) Filed: Dec. 10, 2020

(65) Prior Publication Data
US 2021/0179361 A1    Jun. 17, 2021

Related U.S. Application Data

(60) Provisional application No. 62/947,156, filed on Dec. 12, 2019.

(51) Int. Cl.
*B65G 39/04* (2006.01)

(52) U.S. Cl.
CPC ..................... *B65G 39/04* (2013.01)

(58) Field of Classification Search
CPC .................... B65G 39/04; B65G 23/04; B65G 2812/02148
USPC ........................................................... 492/39
See application file for complete search history.

(56) References Cited

U.S. PATENT DOCUMENTS

| | | | | |
|---|---|---|---|---|
| 2,052,900 A * | 9/1936 | Searles | ................. | B65G 39/04 198/843 |
| 2,405,810 A * | 8/1946 | Berg | ........................ | B63C 5/04 193/42 |
| 3,795,306 A * | 3/1974 | Motoume | .............. | B65G 39/04 198/827 |
| 3,840,102 A * | 10/1974 | Dawson | ................. | B65G 13/11 193/35 R |
| 4,385,683 A * | 5/1983 | Krupp | .................... | B65G 39/02 193/37 |
| 4,402,390 A * | 9/1983 | Feeney | .................. | B65G 39/04 193/37 |
| 5,064,045 A * | 11/1991 | Leon | ....................... | B65G 39/04 193/35 MD |
| 5,676,615 A * | 10/1997 | McGrath | ................ | B65G 39/16 474/101 |
| 6,390,289 B1 * | 5/2002 | Hoggan | ................. | B65G 15/08 198/806 |
| 2005/0000203 A1 * | 1/2005 | Rogers | ................... | A01D 34/82 56/16.7 |
| 2011/0058760 A1 * | 3/2011 | Magnus | ................. | B65G 23/04 384/280 |
| 2011/0176858 A1 * | 7/2011 | Lally | ..................... | B65G 39/04 403/11 |

(Continued)

*Primary Examiner* — Mark A Deuble
(74) *Attorney, Agent, or Firm* — Wood Herron & Evans LLP

(57) ABSTRACT

A roller assembly for use in a conveyor system is disclosed. The roller assembly includes a shaft and a roller rotatably mounted to the shaft. In one embodiment, the roller is made of ultra-high molecular weight plastic. Each roller has first and second ends. The roller assembly further includes a first collar and a second collar mounted on the shaft. The first collar is positioned at the first end of the roller and the second collar is positioned at the second end of the roller. Each collar is selectably affixable to the shaft so as to hold the roller in a fixed position along the length of the shaft.

10 Claims, 3 Drawing Sheets

(56) References Cited

U.S. PATENT DOCUMENTS

2014/0291125 A1\* 10/2014 Li ..................... B65G 39/04
198/780
2015/0374129 A1\* 12/2015 Sozio ................ B65G 39/02
211/151

\* cited by examiner

ROLLER ASSEMBLY

CROSS REFERENCE TO RELATED APPLICATION

This application claims the benefit of U.S. Provisional Patent Application Ser. No. 62/947,156, filed Dec. 12, 2019, the disclosure of which is incorporated by reference herein in its entirety.

TECHNICAL FIELD

The invention relates generally to roller assemblies for supporting conveyor belts.

BACKGROUND

Distribution centers rely heavily on conveyor systems to transport packages throughout their warehouses. Typically, a conveyor system will include an endless belt rotating between to end rollers, with at least one of the end rollers being driven. The upper section of the belt moving in the transport direction typically slides across a steel bed which supports the belt and the packages being carried thereon. The lower section of the belt moving contra to the transport direction is typically supported by a plurality of rollers spaced along the length of the lower section.

Because of automation and faster line speeds, those rollers generate a significant amount of noise in the distribution centers. Some large shipping companies, such as FedEx and UPS, try to limit the noise level in their distribution centers to less than 85 dB. When levels go above 90 dB, then companies may violate OSHA regulations for maximum sound level exposure for workers working an eight hour day. The conveyor systems are a large source of noise in the distribution centers. Two sources generate most of the noise of the conveyor systems. First, the contact point between the roller and the belt generates noise. That contact generates a constant hum from the belt which may be magnified based on the type of belt and number of conveyors in the area. Second, the bearings in the rollers generate noise. Conventional rollers have bearings at each end which over time combined with dirt and contamination getting into the bearings, wear down and generate additional noise. As such, the noise generated by the bearings increases as the bearings age. Consequently, a building may initially comply with OSHA noise level guidelines, but within a year, noise levels have noticeably increased and may violate OSHA noise level guidelines.

In addition to adding to the noise of a distribution center, bearings present a safety hazard. Consequently, a conveyor system using conventional bearings requires guarding so that workers and their clothes will not contact and get wrapped around the bearings.

Because bearings degrade in the presence of dirt and other contaminants, bearings must be changed periodically. Shutting down a conveyor system to change failing bearings can be time consuming and costly as packages can no longer be transported on that shutdown conveyor system. Also, because it is never certain when bearings might fail, the distribution center must keep up to 50 bearings or replacement rollers in stock, which means a lot of money tied up in replacement parts.

What is needed, therefore, is a roller assembly that addresses the deficiencies of roller assemblies using conventional bearings.

SUMMARY OF THE INVENTION

To these and other ends, a roller assembly for use in a conveyor system is disclosed. The roller assembly includes a shaft and a roller rotatably mounted to the shaft. Each roller has first and second ends. In one embodiment, the roller is made of ultra-high molecular weight plastic. The roller assembly further includes a first collar and a second collar mounted on the shaft. The first collar is positioned at the first end of the roller and the second collar is positioned at the second end of the roller. Each collar is selectably affixable to the shaft so as to hold the roller in a fixed position along the length of the shaft. In one aspect, the roller has a center passageway that directly contacts an outer surface of the shaft. The outer surface of the shaft may be polished chrome. In one aspect, the shaft may include a flattened portion at one end of the shaft.

In one embodiment, the roller assembly further includes first and second washers. The first washer is mounted on the shaft between the first collar and the first end of the roller and the second washer is mounted on the shaft between the second collar and the second end of the roller.

In another embodiment, a roller assembly for use in a conveyor system includes a shaft that has a length and an outer surface, which is polished chrome. The shaft has a flattened portion at one end of the shaft. A plurality of rollers is rotatably mounted to the shaft. Each roller is made of ultra-high molecular weight plastic. The plurality of rollers are spaced apart along the length of the shaft. Each roller has opposing ends. A plurality of a pair of collars is mounted on the shaft. The pair of collars is positioned at opposing ends of corresponding ones of the plurality of rollers. Each collar is selectably affixable to the shaft so as to hold the roller in a fixed position along the length of the shaft. A plurality of a pair of washers is mounted on the shaft. The pair of washers is positioned between corresponding pairs of collars and the opposing ends of corresponding ones of the plurality of rollers. Each washer is made of ultra-high molecular weight plastic.

The invention also contemplates a conveyor system for transporting articles that includes a conveyor belt configured to transport the articles. The conveyor system includes a drive roller to move the conveyor belt and a roller assembly with the features discussed herein.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
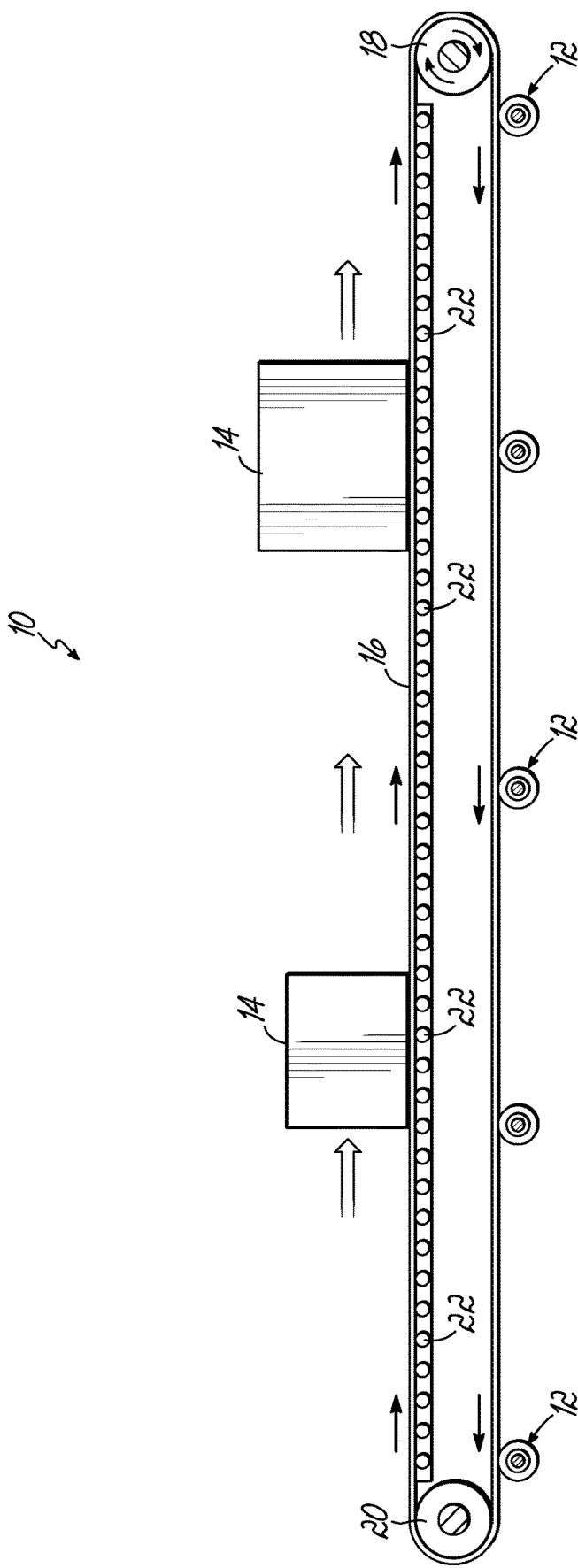
FIG. 1 is a schematic elevation view of a conveyor system incorporating a roller assembly according to an embodiment of the invention.
Figure 2:
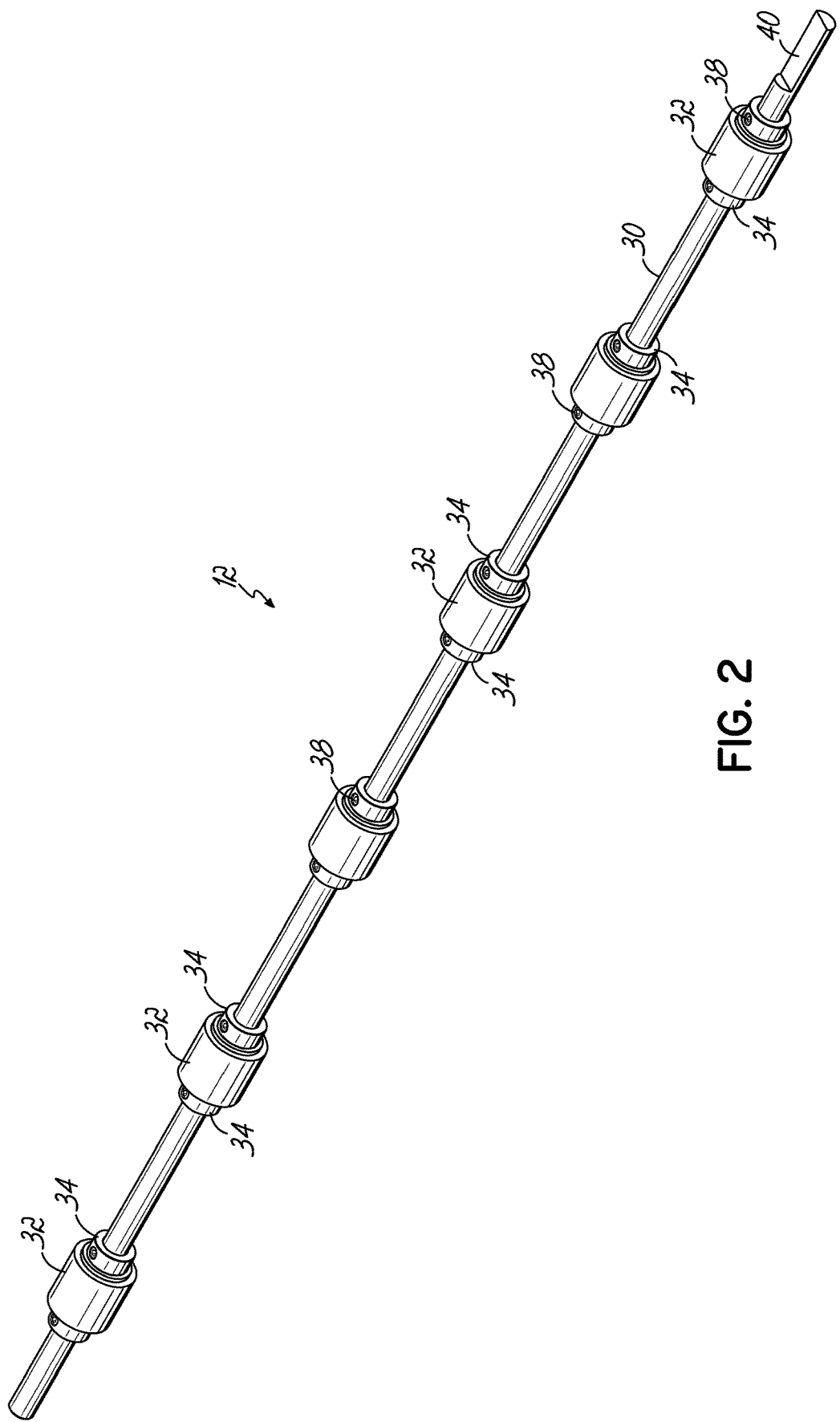
FIG. 2 is a perspective view of the roller assembly of FIG. 1.
Figure 3:
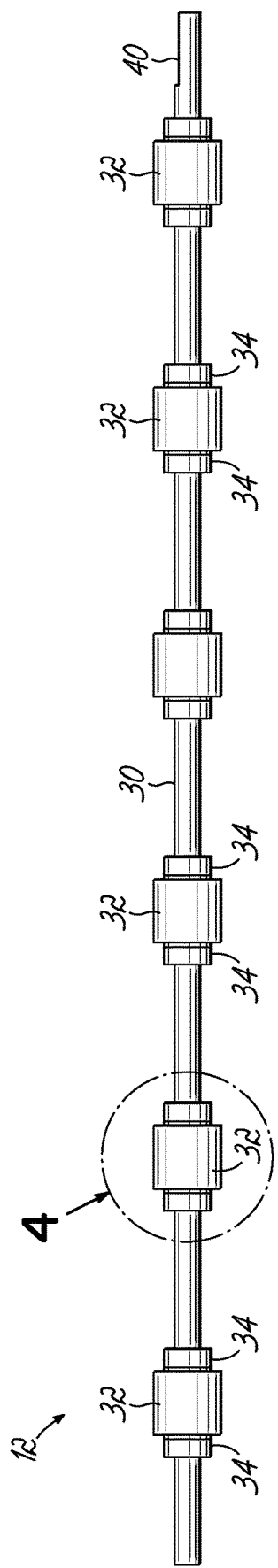
FIG. 3 is an elevation view of the roller assembly of FIG. 2.
Figure 5:
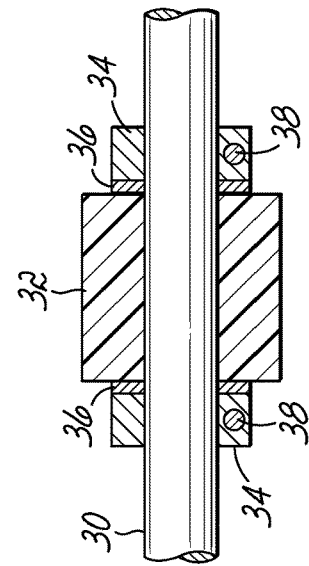
FIG. 5 is a partial cross-section of the section of the roller assembly of FIG. 4.
Figure 4:
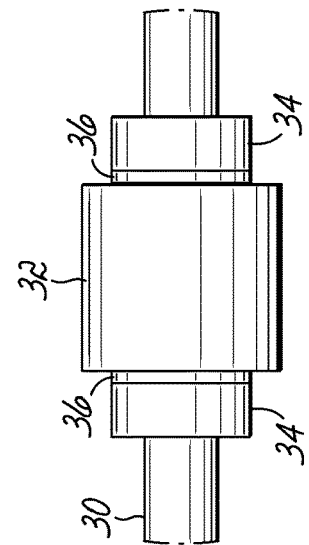
FIG. 4 is a close-up view of a section of the roller assembly of FIG. 3.

FIG. 1 is a schematic representation of a conveyor system 10, which incorporates a roller assembly 12 according to one embodiment of the invention. The conveyor system 10 is configured to transport articles such as boxes or packages 14 (from left to right as illustrated) atop a moving conveyor belt 16. A drive roller 18 pulls the conveyor belt 16 from one end and an idler roller 20 takes up the returning conveyor belt 16 at the other end. A plurality of upper conveyor rollers 22 positioned directly below and in contact with the conveyor belt 16 support the conveyor belt 16 as it transports the boxes or packages 14. The contact surface of each upper conveyor roller 22 extends across the entire width of the conveyor belt 16. The roller assemblies 12 are positioned below the conveyor belt 16 to support it as it returns along the bottom of the conveyor system 10.

The roller assembly 12 according to one embodiment of the invention is illustrated in FIGS. 2-5. The roller assembly 12 includes a shaft 30 and spaced-apart rollers 32, which are held in position along the shaft 30 by collars 34 disposed on either end of the rollers 32. Washers 36 may be disposed between the roller 32 and the collars 34. Each roller 32 may be repositioned along the shaft 30 by loosening the collars 34 securing that roller 32, such as by unscrewing a set screw 38, and sliding the collars 34 and the roller 32 to the new position and then re-securing the collars 34 to the shaft 30 thereby holding the roller 32 in the new position. At least one end of the shaft 30 includes a flattened portion 40. The flattened portion 40 may be used to secured the shaft 30 so the shaft 30 does not rotate when the conveyor belt 16 is moving. Instead, the rollers 32 rotate about the fixed shaft 30 when the conveyor belt 16 is moving.

The rollers 32 may range in length from between 1" and 5", and preferably 2". The rollers 32 and washers 36 may be made from ultra-high molecular weight (UHMW) plastic, HDPE, Nylon, Delrin, or Acetal. The shaft 30 preferably has a polished chrome outer surface. Thus, in a typical application, UHMW plastic rollers 32 are installed on the polished chrome shaft 30. In this configuration, the UHMW roller 32 experiences very little friction as it rotates around the polished chrome shaft 30, which is fixed from rotating because of flattened portion 40.

The roller assembly 12 of the invention generates significantly less noise than known roller assembly designs for at least the following reasons. First, UHMW is a very good sound dampening material. As such, when the conveyor belt 16 contacts the UHMW roller 32, it generates almost no noise. Second, the roller assembly 12 may have between 4 and 6 rollers 32 along the length of the shaft 30 depending on the width of the conveyor belt 16, with typical belts sizes being 43", 48", and 60". With the belt contacting only 4 to 6 rollers 32, there is a lot less surface contact between the conveyor belt 16 and the rollers 32 to generate noise compared to a conventional roller assembly. Third, the roller assembly 12 does not use any bearings between the roller 32 and the shaft 30. Consequently, the roller assembly 12 does not generate nearly as much noise as a convention roller assembly using bearings. Moreover, because there are no bearings in roller assembly 12, the roller assembly 12 does not get noisier as it ages. In contrast, a roller assembly that uses bearings gets louder over time because the bearings collect dirt which causes increased noise and the bearings deteriorate/wear which also causes increased noise.

The use of rollers 32 mounted on the polished chrome shaft 30 also provides a safety feature. Conventional rollers will typically pull a worker's hand or clothing into it potentially causing serious bodily harm. To minimize the risk of being pulled into a conventional roller, conveyor system operators often install guarding to protect the workers from the rotating rollers. Advantageously, each of the rollers 32 operate independently of each other. Consequently, should a worker contact one of the rollers 32, the roller 32 simply stops, which prevents a hand or clothing from getting pulled into the roller 32. Because hands and clothing will not get pulled into the rollers 32, much, if not all, of the guarding that is typically required around conventional rollers may be eliminated which represents a significant cost savings when the conveyor system 10 is installed and maintained.

It is expected that rollers 32 will last at least 2-3 times longer (if not longer) because the rollers 32 do not need a bearing to operate. When bearings fail on a convention roller, either the bearing or the entire roller/bearing combination must be replaced. If the roller 32 does wear out, replacing it is a very simple process taking less time to replace than a conventional roller/bearing combination. Because the rollers 32 are expected to last so much longer, a conveyor system operator need not stock as many replacement rollers 32 compared to the large number of conventional roller/bearing combinations that need to be stocked.

The invention also contemplates a method for using the roller assembly 12. The method includes providing the conveyor belt 16 adapted to carry items (e.g., box or packages 14) thereon. Further providing the roller assembly 12 having the shaft 30 and at least one roller 32 rotatably mounted to the shaft 30, wherein the at least one roller 32 is made of UHMW. Supporting at least one surface of the conveyor belt 16 with the at least one roller 32.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A roller assembly for use in a conveyor system comprising:
   a shaft;
   a roller rotatably mounted to the shaft, the roller having first and second ends, the roller made of ultra-high molecular weight plastic; and
   a first collar and a second collar mounted on the shaft, the first collar positioned at the first end of the roller and the second collar positioned at the second end of the roller, wherein each collar being selectably affixable to the shaft so as to hold the roller in a fixed position along the length of the shaft,
   wherein the roller has a center passageway that directly contacts an outer surface of the shaft, and
   wherein the outer surface of the shaft is polished chrome.

2. The roller assembly of claim 1, further comprising first and second washers, the first washer being mounted on the shaft between the first collar and the first end of the roller, the second washer being mounted on the shaft between the second collar and the second end of the roller.

3. The roller assembly of claim 1, wherein the shaft has a flattened portion at one end of the shaft.

4. A roller assembly for use in a conveyor system comprising:

a shaft having a length and an outer surface, the outer surface being polished chrome, the shaft have a flattened portion at one end of the shaft;

a plurality of rollers rotatably mounted to the shaft, each roller being made of ultra-high molecular weight plastic, the plurality of rollers being spaced apart along the length of the shaft, each roller having opposing ends;

a plurality of a pair of collars mounted on the shaft, the pair of collars positioned at the opposing ends of corresponding ones of the plurality of rollers, wherein each collar being selectably affixable to the shaft so as to hold the roller in a fixed position along the length of the shaft;

a plurality of a pair of washers mounted on the shaft, the pair of washers being positioned between corresponding pairs of collars and the opposing ends of corresponding ones of the plurality of rollers, each washer being made of ultra-high molecular weight plastic.

5. A conveyor system for transporting articles comprising:
a conveyor belt configured to transport the articles;
a drive roller to move the conveyor belt; and
a roller assembly including:
  a shaft;
  a roller rotatably mounted to the shaft, the roller made of ultra-high molecular weight plastic, each roller having first and second ends; and
  a first collar and a second collar mounted on the shaft, the first collar positioned at the first end of the roller and the second collar positioned at the second end of the roller, wherein each collar being selectably affixable to the shaft so as to hold the roller in a fixed position along the length of the shaft,
wherein the roller is positioned to support the conveyor belt,
wherein the roller has a center passageway that directly contacts an outer surface of the shaft, and
wherein the outer surface of the shaft is polished chrome.

6. The conveyor system of claim 5, wherein the roller assembly further includes first and second washers, the first washer being mounted on the shaft between the first collar and the first end of the roller, the second washer being mounted on the shaft between the second collar and second end of the roller.

7. The conveyor system of claim 5, wherein the shaft has a flattened portion at one end of the shaft.

8. A roller assembly for use in a conveyor system comprising:
a shaft;
a roller rotatably mounted to the shaft, the roller having first and second ends, the roller made of ultra-high molecular weight plastic; and
a first collar and a second collar mounted on the shaft, the first collar positioned at the first end of the roller and the second collar positioned at the second end of the roller, wherein each collar being selectably affixable to the shaft so as to hold the roller in a fixed position along the length of the shaft,
wherein the roller has a center passageway that directly contacts an outer surface of the shaft, and
wherein the outer surface of the shaft is chrome.

9. The roller assembly of claim 8, further comprising first and second washers, the first washer being mounted on the shaft between the first collar and the first end of the roller, the second washer being mounted on the shaft between the second collar and the second end of the roller.

10. The roller assembly of claim 9, wherein the first and second washers are made of ultra-high molecular weight plastic.

* * * * *